United States Patent [19]

Fischer et al.

[11] Patent Number: 5,907,588
[45] Date of Patent: May 25, 1999

[54] DEVICE FOR COLLECTING CORE MELT FROM A REACTOR PRESSURE VESSEL

[75] Inventors: Manfred Fischer, Erlangen; Dietmar Bittermann, Fürth; Lothar Wistuba; Horst Weisshäupl, both of Herzogenaurach, all of Germany

[73] Assignee: Siemens Aktiengesellschaft, Munich, Germany

[21] Appl. No.: 08/944,841

[22] Filed: Oct. 6, 1997

Related U.S. Application Data

[63] Continuation of application No. PCT/DE96/00478, Mar. 19, 1996.

[30] Foreign Application Priority Data

Apr. 5, 1995 [DE] Germany .................. 195 12 287

[51] Int. Cl.⁶ .................................................. G21C 9/016
[52] U.S. Cl. ........................................................ 376/280
[58] Field of Search ........................................... 376/280

[56] References Cited

U.S. PATENT DOCUMENTS

| | | | |
|---|---|---|---|
| 3,629,064 | 12/1971 | Zivi | 376/280 |
| 4,036,688 | 7/1977 | Golden et al. | 376/280 |
| 4,978,496 | 12/1990 | Dumas et al. | 376/280 |
| 5,049,352 | 9/1991 | Tutu et al. | 376/280 |
| 5,315,625 | 5/1994 | Turricchia | 376/280 |
| 5,402,456 | 3/1995 | Schabert et al. | 376/280 |

FOREIGN PATENT DOCUMENTS

| | | |
|---|---|---|
| 0 541 167 A1 | 5/1993 | European Pat. Off. . |
| 2 336 772 | 7/1977 | France . |
| 2 616 578 | 12/1988 | France . |
| 22 34 782 | 1/1974 | Germany . |
| 43 06 864 C2 | 9/1994 | Germany . |
| 43 19 094 A1 | 12/1994 | Germany . |
| 2 103 657 | 2/1983 | United Kingdom . |
| 2 236 210 | 3/1991 | United Kingdom . |
| 88/09998 | 12/1988 | WIPO . |

*Primary Examiner*—Daniel D. Wasil
*Attorney, Agent, or Firm*—Herbert L. Lerner; Laurence A. Greenberg

[57] ABSTRACT

A device for collecting core melt from a reactor pressure vessel improves a flow of the core melt out of the reactor pressure vessel. A prechamber is disposed below the reactor pressure vessel and a spreading chamber for the core melt is disposed laterally next to the reactor pressure vessel. The spreading chamber is connected to the prechamber through a channel. A base unit forms a bottom region at least of the prechamber and is made of a material having high thermal conductivity.

19 Claims, 9 Drawing Sheets

DEVICE FOR COLLECTING CORE MELT FROM A REACTOR PRESSURE VESSEL

CROSS-REFERENCE TO RELATED APPLICATION

This application is a continuation of International Application Ser. No. PCT/DE96/00478, filed Mar. 19, 1996.

BACKGROUND OF THE INVENTION

Field of the Invention

The invention relates to a device for collecting and cooling core melt from a reactor pressure vessel (RPV). It is, in particular, usable in the case of an EPR pressurized water reactor.

German Published, Non-Prosecuted Patent Application DE 43 19 094 A1, corresponding to International Publication WO 94/29876 and U.S. application Ser. No. 08/569,676, filed Dec. 8, 1995, now U.S. Pat. No. 5,867,548, discloses a device for collecting and cooling core melt from an RPV, in which a prechamber that is connected through a channel to a spreading chamber, is disposed below the RPV. On the reactor side, the channel has a barrier wall or separating wall which is destroyed by the core melt within a predetermined time after the core melt has arrived. The prechamber is constructed approximately frustoconically and is bounded at the bottom by a refractory concrete base which serves somewhat as a crucible. The concrete base should be made of a refractory ceramic or special bricks. In that case, when the material alloys with the core melt the effect of the material is preferably to reduce the melting point, with the result that it makes the core melt less viscous. The bottom of the spreading chamber is lined with a heat-resistant material.

German Patent DE 43 06 864 C2 discloses a safety configuration for a nuclear reactor, in which a collection device for the core melt is disposed below the reactor pressure vessel. In that case the collection vessel is a structure made of cast elements of cast iron and/or cast steel, which forms an outflow system for the core melt. The collection device in that case corresponds, in comparison to the above-mentioned prior art, to the spreading chamber located therein, which is disposed laterally next to the RPV in that device. In that configuration, no prechamber is provided. The purpose of the collection device is clearly to cool the collected core melt in an accumulation chamber. In the case of a core melt gradually flowing downwards, plugging of the supply channels can possibly occur as a result of excessive cooling. Additional cooling is prevented in that way, as a result of which further damage can possibly occur. German Published, Prosecuted Patent Application DE-AS 22 34 782 discloses a reactor core vessel, in which a receptacle for collecting the core in the event of a core meltdown is disposed below fuel elements. In order to provide cooling, the receptacle is constructed in such a way as to be ribbed in the manner of a heat sink on the side remote from the core and is in contact with the water of a coolant circuit. The core melt can be cooled in this way. The receptacle is disposed inside the RPV in this case.

SUMMARY OF THE INVENTION

It is accordingly an object of the invention to provide a device for collecting and cooling core melt from a reactor pressure vessel, which overcomes the hereinafore-mentioned disadvantages of the heretofore-known devices of this general type and which achieves improved flow of the core melt into its spreading chamber.

With the foregoing and other objects in view there is provided, in accordance with the invention, a device for collecting core melt from a reactor pressure vessel, comprising a prechamber disposed below the reactor pressure vessel; a spreading chamber disposed laterally next to the reactor pressure vessel for receiving the core melt; a channel connecting the spreading chamber to the prechamber; and a base unit forming a bottom region at least of the prechamber, the base unit made of a material having such a high thermal conductivity that a crust forms after arrival of the core melt on the base unit.

In this way, the core melt first of all forms a crust on the base unit which acts as an autogenous crucible. The base unit is thereby initially protected from damage. This is achieved by virtue of the good heat dissipation of the base unit. The autogenous crucible has an insulating effect on the remaining core melt, so that the latter at first maintains its consistency (liquid). After a barrier wall has been opened, the core melt then flows continuously or constantly into the spreading chamber. The intention in this case is for all of the core, as far as possible, to flow at once out of the prechamber into the spreading chamber.

In accordance with another feature of the invention, the base unit is made of metal. The desired thermal conductivity is thereby produced, which leads to good crust formation.

In accordance with a further feature of the invention, the base unit is composed of subunits. The device is thereby easy to transport and simple to install.

In accordance with an added feature of the invention, the base unit is constructed on the prechamber side in the manner of a crucible. A container structure is thereby obtained which allows favorable thermic handling of the core melt.

In accordance with an additional feature of the invention, the base unit has a cooling device. Melting of or damage to the base unit is thereby prevented. Long-term thermal overloading is additionally prevented.

In accordance with yet another feature of the invention, at least the prechamber, and optionally the channel, is filled with packing units. Additional stress on the prechamber due to a steam explosion is thereby likewise avoided.

In accordance with yet a further feature of the invention, the bottom surfaces of the channel and/or the spreading space are formed by cooled bottom elements. Good dissipation of the residual heat is possible in this way. Such bottom elements can be laid easily and additionally provide equalization in the event of temperature fluctuations.

In accordance with yet an added feature of the invention, in order to provide good sealing with regard to the coolant, the bottom elements have tongue and groove connections or a stepped connection at their connection points or locations.

In accordance with a concomitant feature of the invention, there is provided a flexible seal interposed between the bottom elements. This provides a good mechanical connection and liquid leak-tightness.

Other features which are considered as characteristic for the invention are set forth in the appended claims.

Although the invention is illustrated and described herein as embodied in a device for collecting core melt from a reactor pressure vessel, it is nevertheless not intended to be limited to the details shown, since various modifications and structural changes may be made therein without departing from the spirit of the invention and within the scope and range of equivalents of the claims.

The construction and method of operation of the invention, however, together with additional objects and

DESCRIPTION OF THE PREFERRED EMBODIMENTS

Figure 1:
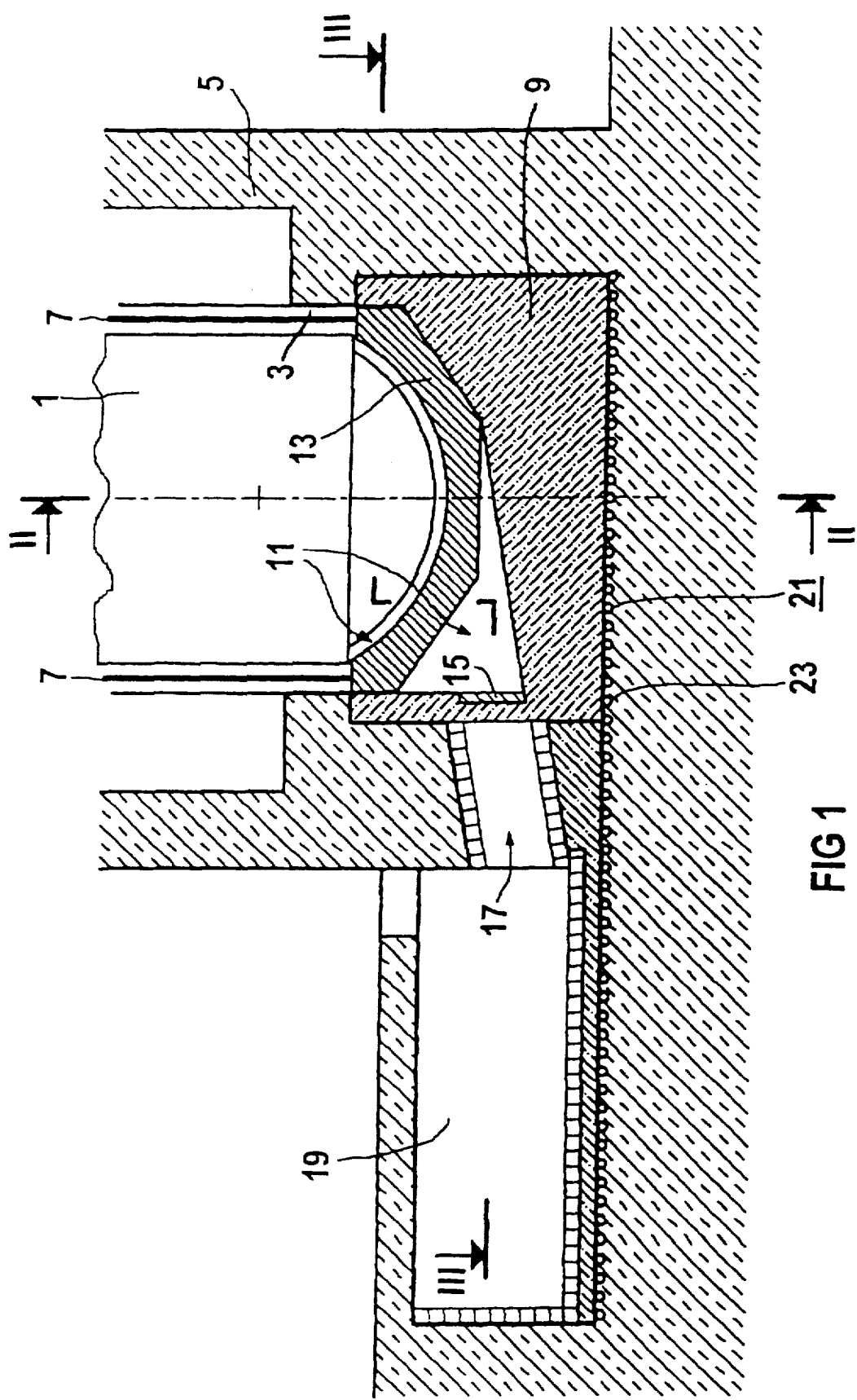
FIG. 1 is a fragmentary, diagrammatic, longitudinal-sectional view of a reactor cavity with a reactor pressure vessel disposed therein, which is taken along a line I—I of FIG. 3, in the direction of the arrows.

Referring now to the figures of the drawings in detail and first, particularly, to FIG. 1 thereof, there is seen a reactor pressure vessel (RPV) 1 which is disposed in a reactor cavity 3. The reactor cavity 3 in this case is formed by a concrete structure 5. Insulation 7, which encloses the RPV 1, is disposed between a wall of the reactor cavity 3 and the RPV. The RPV 1 contains a non-illustrated water-cooled reactor core. An upper part of the reactor cavity 3 is cylindrically constructed and a lower part thereof is constructed with a vaulted shape, especially frustoconically. In this case, the reactor cavity 3 has a crucible-shaped structure. The crucible shape is formed by a base unit 9. An intermediate space remaining between the RPV 1 and the base unit 9, which serves as a prechamber 11 for collecting core melt, is equipped with a packing unit 13 which serves to displace water out of the prechamber 11. This prevents a steam explosion when hot core melt escapes.

The lowest point of the prechamber 11 is closed off by a barrier wall or dividing wall 15. The barrier wall or dividing wall 15 is constructed in such a way that it is destroyed by melting by the core melt after a predetermined time, as a result of which a path through a channel 17 into a spreading chamber 19 is opened. The spreading chamber 19 in this case is disposed laterally next to the RPV 1. The spreading chamber 19 in this case serves substantially as a cooling space and final accumulation space for the core melt. Further details regarding the function of the prechamber 11, of the channel 17 and of the spreading chamber 19, as well as their dimensioning, are disclosed by and can be found in German Published, Non-Prosecuted Patent Application DE 43 19 094 A1, corresponding to International Publication WO 94/29876 and U.S. application Ser. No. 08/569,676, filed Dec. 8, 1995, now U.S. Pat. No. 5,867,548, as mentioned above.

The configuration of the base unit 9 and, where appropriate, of bottom regions of the spreading chamber 19 and the channel 17 are essential for the concept of the present invention. The base unit 9, which at least forms a bottom region of the prechamber 11 (optionally, the base unit 9 can also form the bottom region of the channel 17) is made of a material having high thermal conductivity. The base unit 9 in this case is annularly surrounded by the concrete structure 5. Preferably, the base unit 9 is made of a metal, as a result of which the high thermal conductivity is ensured. However, other materials are also conceivable, for example a high-density ceramic.

The base unit 9 may be formed by non-illustrated individual base elements, for example elements with the shape of a sector of a circle or a sector of a circular annulus, which may also be disposed in slices or layers. This makes them easy to transport.

The prechamber 11 then has the function of initially collecting the escaping core melt. To this end, the dividing or barrier wall 15 is initially closed. The dividing or barrier wall 15 must therefore be dimensioned in such a way that it remains functional for a time of approximately 10 to 30 minutes. The packing unit 13 is destroyed by the emergence of the core melt, so that the core melt can spread out in the prechamber 11 and can accumulate.

The new function of the base unit 9 then sets in. By virtue of its high thermal conductivity, the core melt lying on top of the base unit 9 is strongly cooled, so that the latter forms a crust. An autogenous crucible, so to speak, is thereby formed, in which the core melt is held. In addition, an insulating effect for the core melt is also provided. The cooling is dimensioned in this case in such a way that, by virtue of the insulating effect of the crust, a sufficiently large volume of core melt accumulates in the prechamber 11.

The purpose of this structure is to ensure that, when the barrier wall or dividing wall 15 is destroyed, all of the core melt flows steadily at once out of the prechamber 11 into the spreading chamber 19. In this case it is advantageous if, as far as possible, the entire core equipment has melted and is inside the prechamber 11 or inside the reactor cavity 3. The autogenous crucible formed by the core melt additionally prevents penetration or destruction of the base unit 9 and its structure. It is optionally possible to provide a special cooling device in or on the barrier wall or dividing wall 15, in order to more accurately determine the time of destruction of this wall. The timing of the entire process can be better controlled in this way.

Additionally, the base unit 9 may be provided on its underside with a cooling device 21 which is constructed in the manner of integrated cooling pipes or cooling coils as shown. The cooling device 21 may also extend further, in the bottom region of the channel 17 and the spreading chamber 19. However, additional or alternative cooling systems may also be provided for the channel 17 and the spreading chamber 19, if appropriate. The concrete structure 5 in addition spreads out as a concrete foundation in the bottom region below the cooling device 21.

Figure 2:
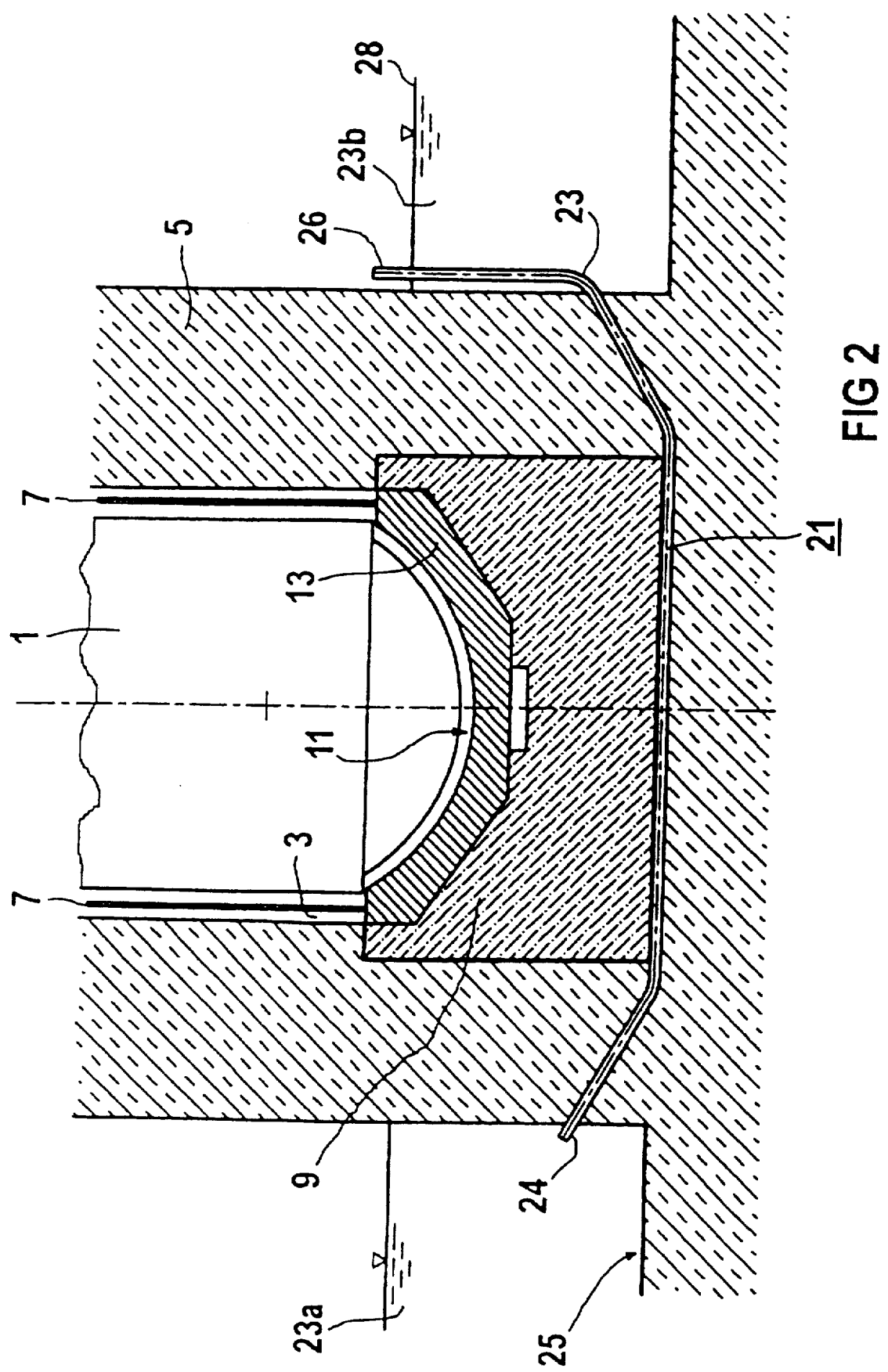
FIG. 2 is a fragmentary, sectional view of the reactor cavity, which is taken along a line II—II of FIG. 1, in the direction of the arrows.

The function of the cooling device 21 can be seen from FIG. 2. First and second coolant tanks 23a and 23b are disposed on both sides of the reactor cavity 3. These tanks may also be connected to each other or else formed by a common vessel. A cooling pipe 23, which is shown as an example of other cooling pipes of the device 21, in this case extends from a first end 24 in a lower bottom region 25 of the first coolant tank 23a, in cooling contact within or below the base unit 9, and along into the second coolant tank 23b. A second end 26 of the cooling pipe or line 23 is disposed in this case at a high level in the second coolant tank 23b, above a water level 28 in the latter, so that no coolant can flow back from the second tank 23b into the first tank 23a.

Steam is formed when the cooling liquid inside the cooling tube 23 along the base unit 9 is heated, with the water pressure formed by the high water level in the first coolant tank 23a displacing the steam into the second coolant tank 23b, where it condenses and precipitates. A uniform flow of coolant in the direction from the first tank 23a to the second tank 23b is ensured in this way. The cooling device 23 can thus operate passively, without additional energy supply. Where appropriate, steam which is possibly still produced may be discharged into the atmosphere of the containment. If the cooling effect during passive operation is not sufficient, then additional active cooling, especially long-term cooling, may be provided, if appropriate, through a non-illustrated device.

Figure 3:
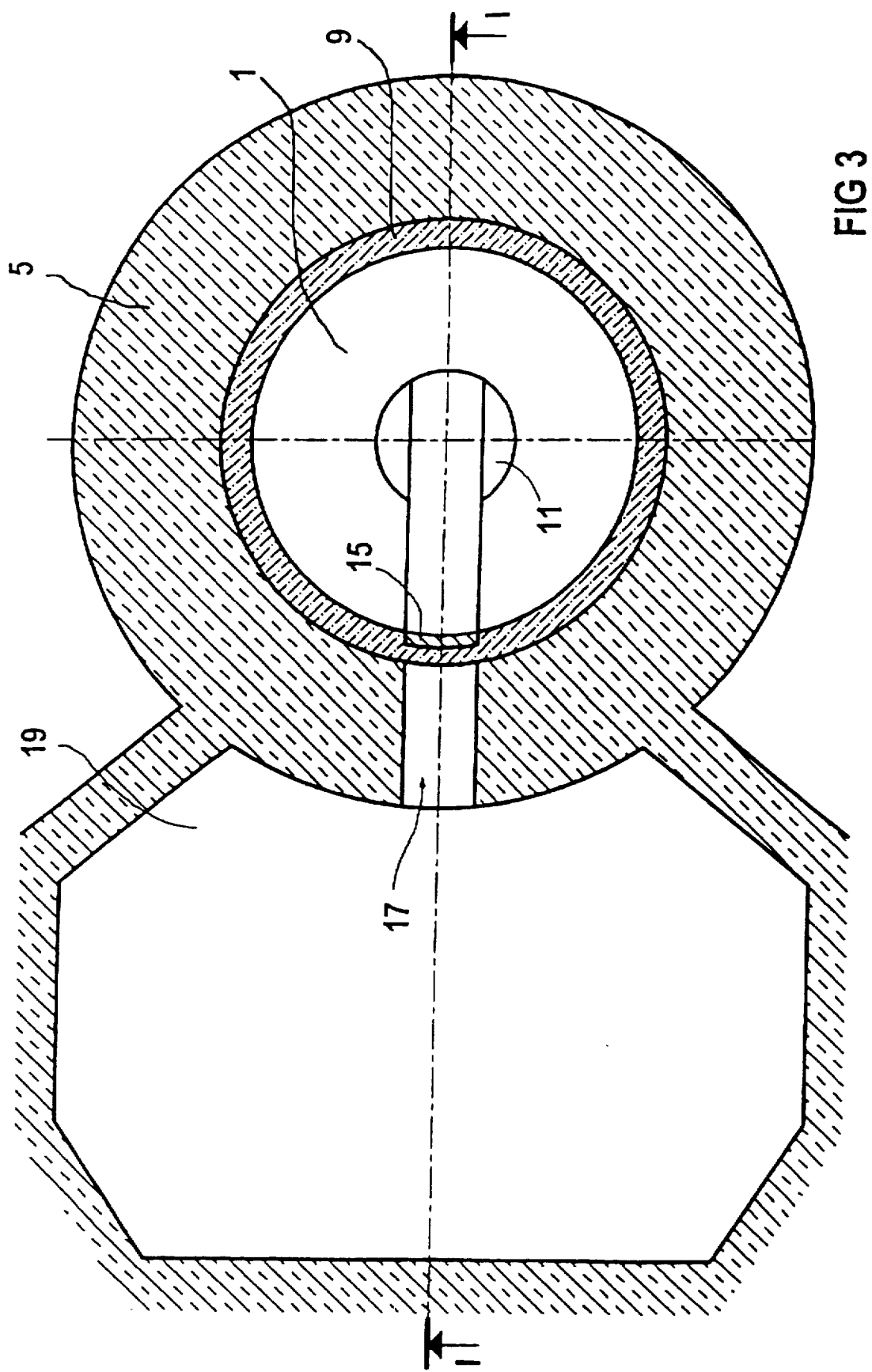
FIG. 3 is a sectional view of the reactor cavity, which is taken along a line III—III of FIG. 1, in the direction of the arrows.

FIG. 3 shows the concrete structure 5 in a cross-section taken along the line III—III in FIG. 1. The channel 17 which connects the prechamber 11 to the spreading chamber 19 can be seen in this figure. In this case, the spreading chamber 19 essentially has a rectangular shape, with its corners being beveled. Its structural configuration is such that the core melt suddenly emerging from the channel 17 can spread out quickly and conformally, without piles or jams being formed. The bottom of the spreading chamber 19 is kept relatively thin, so that strong heat dissipation through the cooling device 21 is provided. Lasting cooling of the core melt in the spreading space 19 is thereby achieved.

Figure 4:
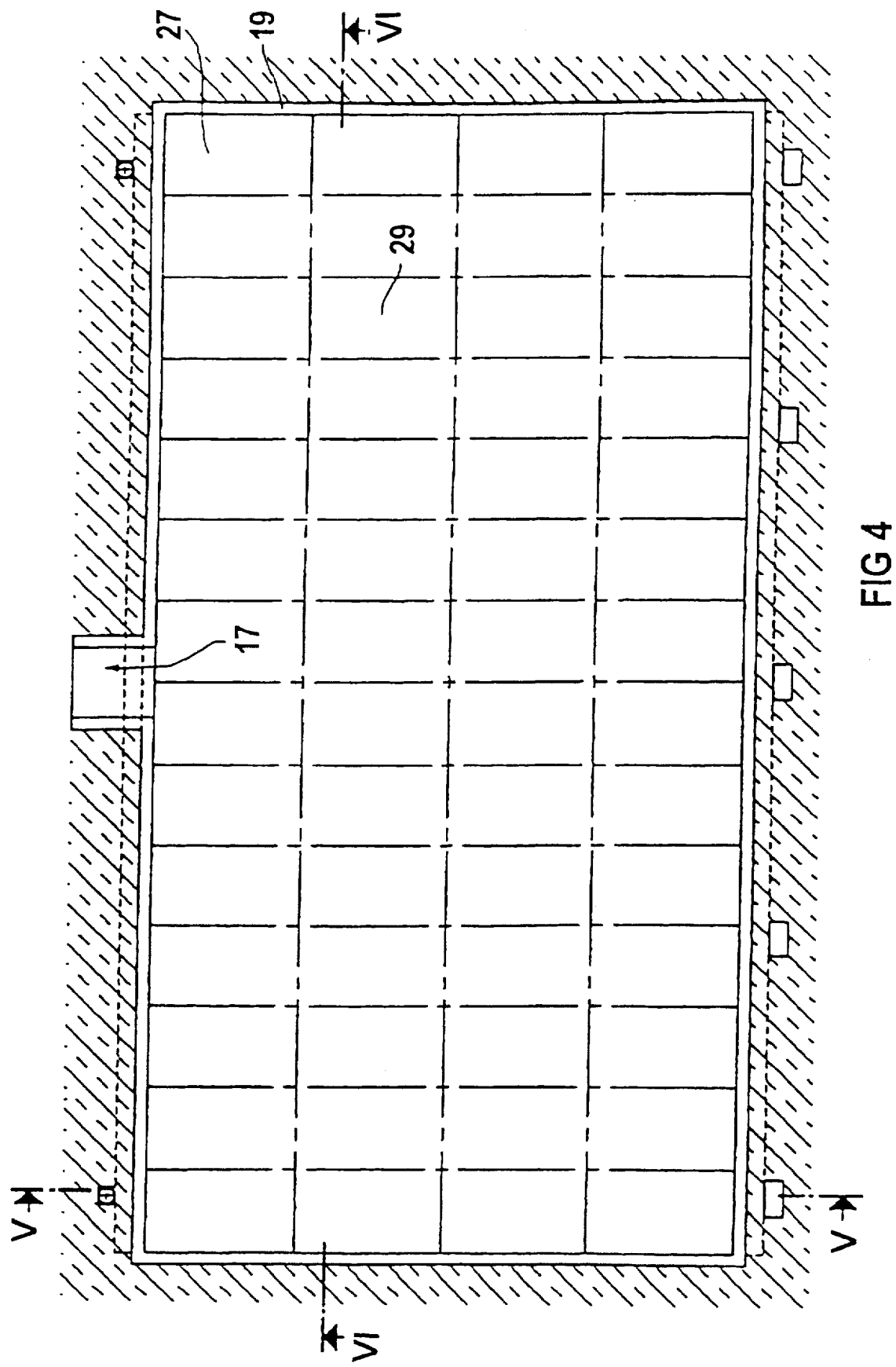
FIG. 4 is a fragmentary, sectional view of an alternative spreading chamber, which is taken along a line IV—IV of FIG. 6, in the direction of the arrows.
Figure 5:
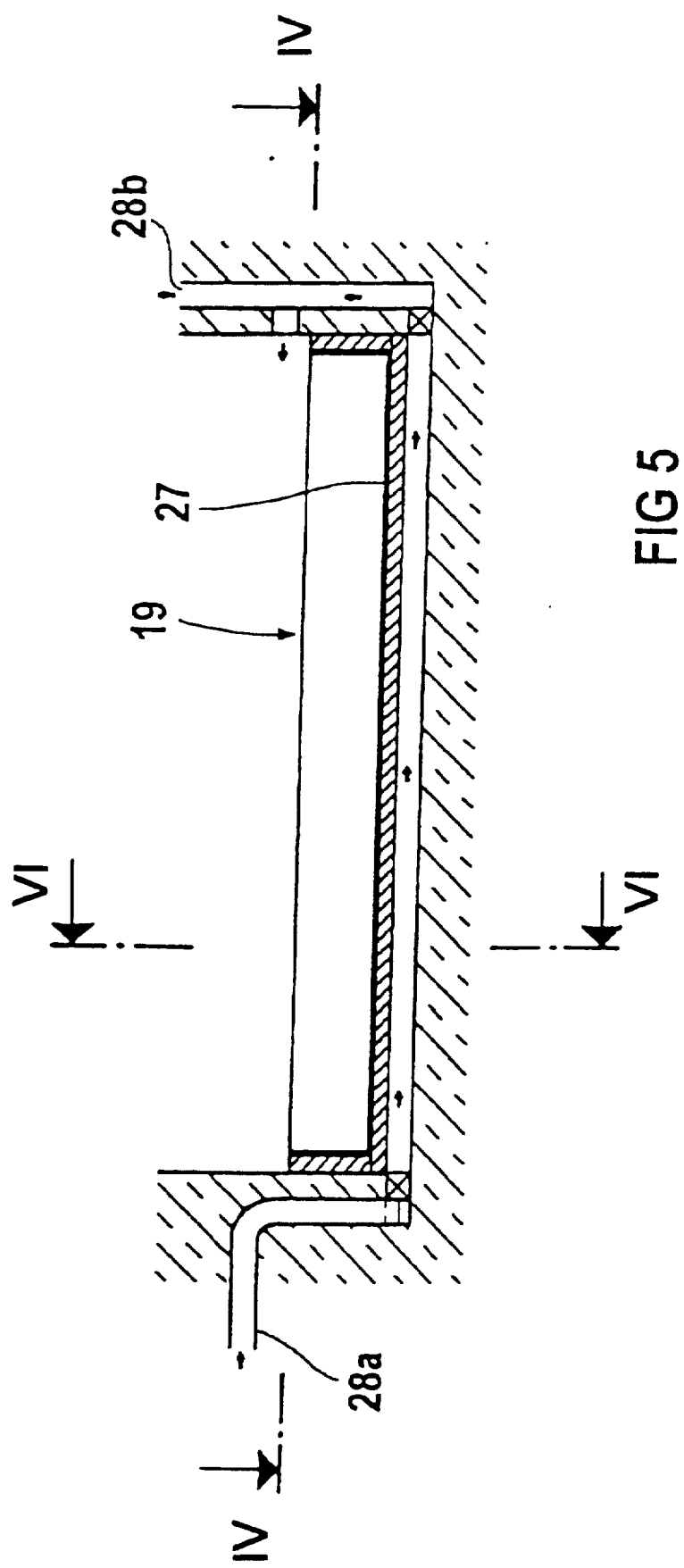
FIG. 5 is a fragmentary, sectional view of the alternative spreading chamber, which is taken along a line V—V of FIG. 6, in the direction of the arrows.
Figure 6:
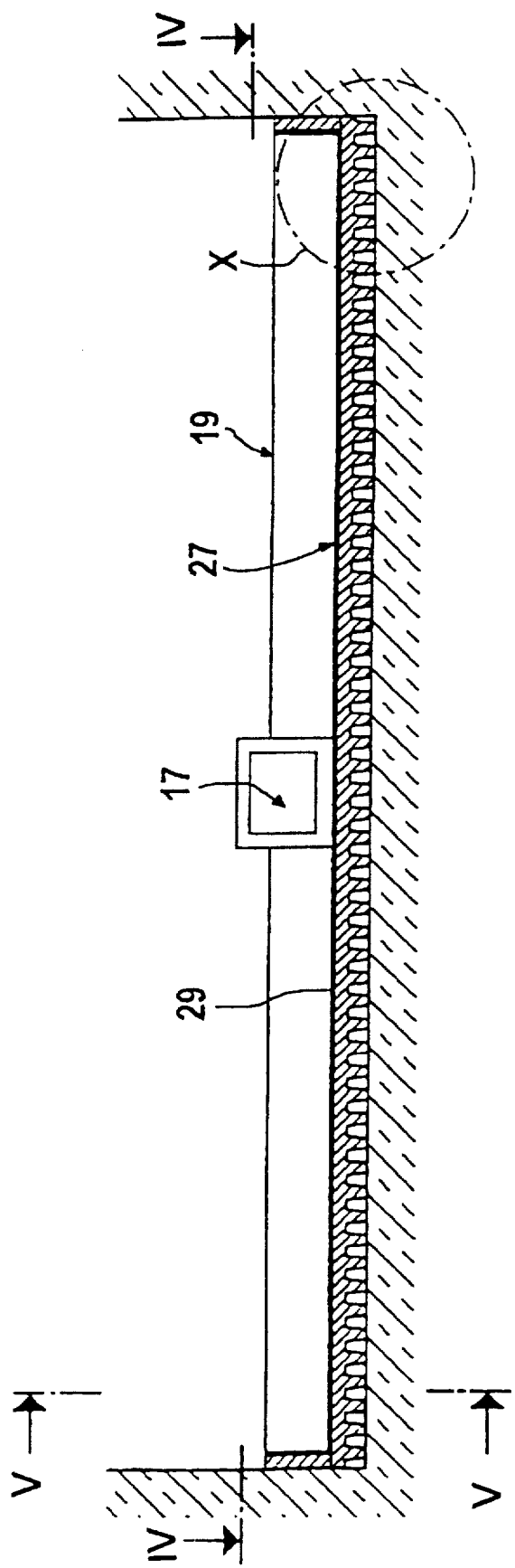
FIG. 6 is a fragmentary, sectional view of the alternative spreading chamber, which is taken along a line VI—VI of FIG. 4, in the direction of the arrows.

FIGS. 4, 5 and 6 show an alternative rectangularly constructed spreading chamber 19, having a bottom region 27 which is constructed as a cooling bottom. Other desired or technically required shapes may also be chosen for the spreading chamber 19. The bottom region is constructed underneath in this case in the manner of cooling fins, through which coolant of the cooling device 21 flows. Fast dissipation of residual heat in the core melt is possible in this way. The bottom region 27 has a ribbed structure providing a very stable structural configuration, so that the load of the core melt can be supported well. The coolant flow is indicated by arrows according to FIG. 5, with pipe ends 28a and 28b respectively corresponding to the ends 24 and 26 of the coolant line 23 in FIG. 2.

As can be seen from the plan view of the bottom region 27 in FIG. 4, the bottom region 27 may preferably be formed by bottom elements 29. This makes transport and handling easier. It is thereby also possible to use standard bottom elements 29 for different sizes of spreading spaces.

Figure 7:
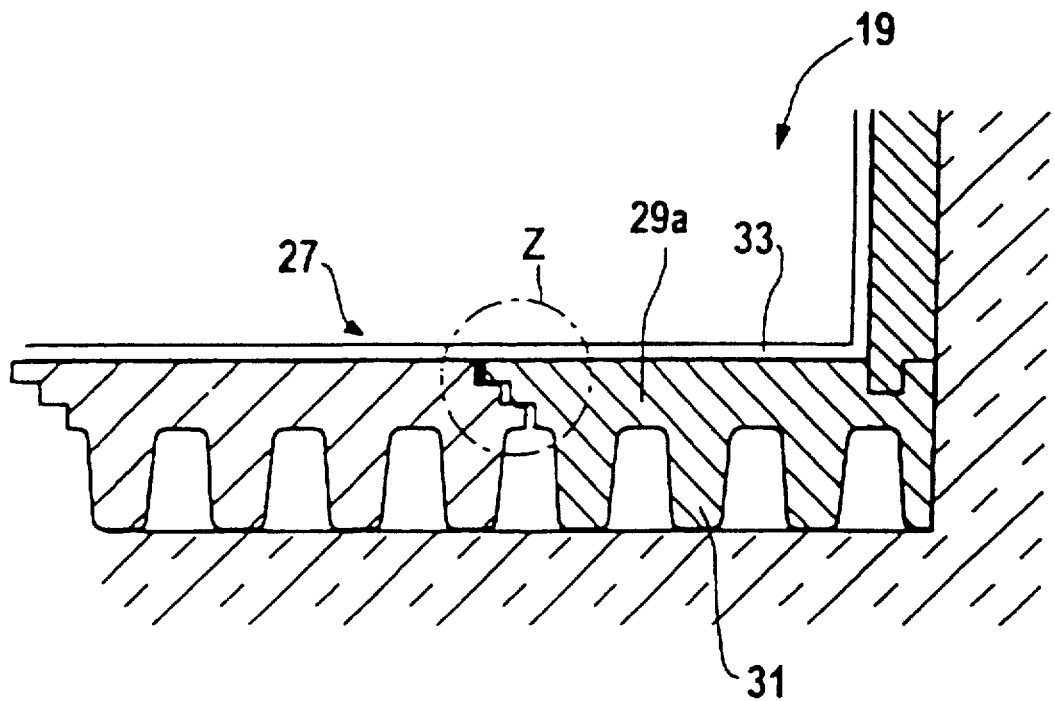
FIG. 7 is an enlarged, fragmentary, sectional view of a bottom element according to a portion X in FIG. 6.
Figure 8:
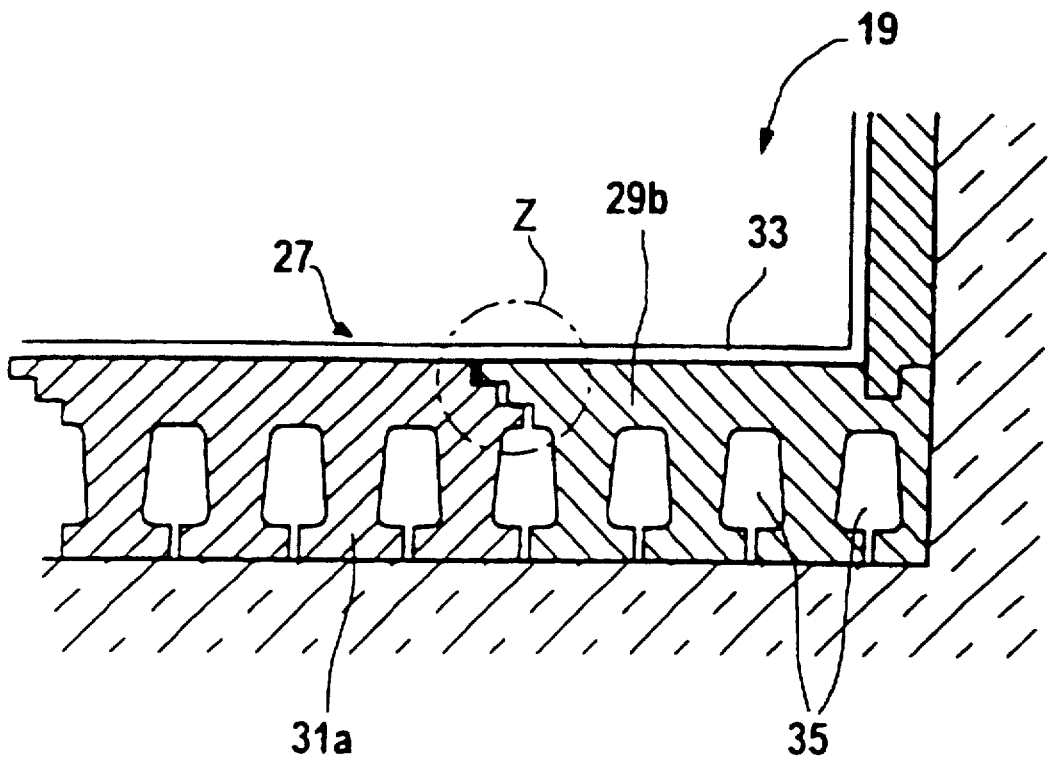
FIG. 8 is a fragmentary, sectional view of an alternative bottom element to that shown in FIG. 7.
Figure 9:
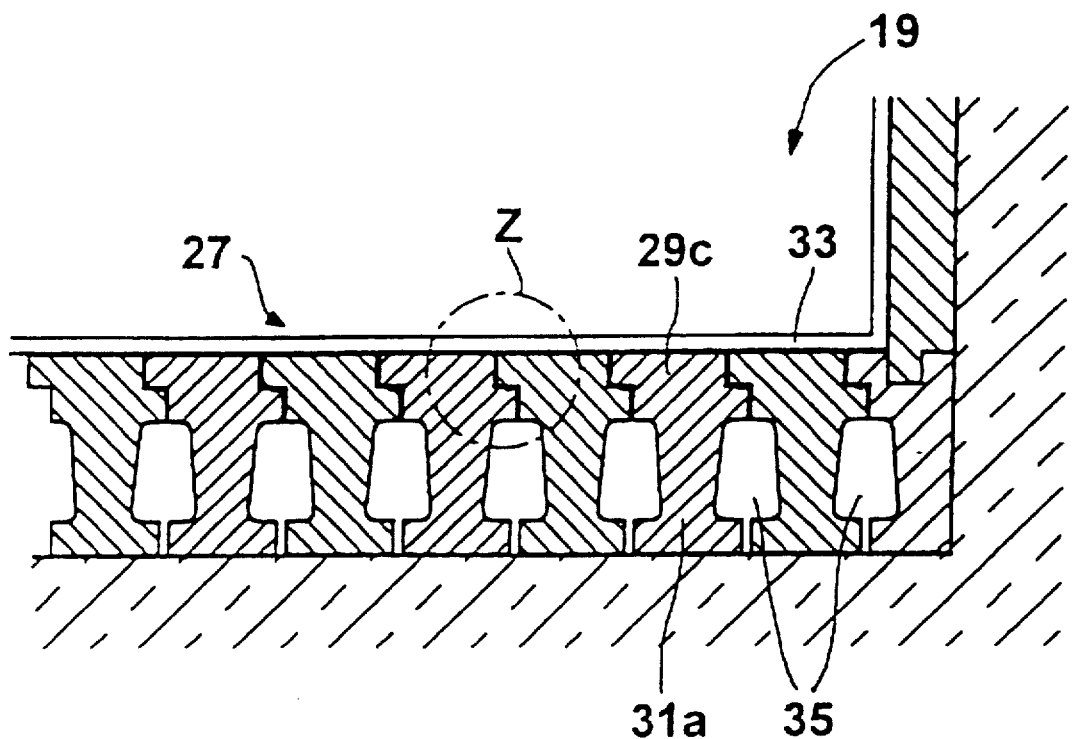
FIG. 9 is a fragmentary, sectional view of yet another alternative to the bottom element shown in FIG. 8.
Figure 10:
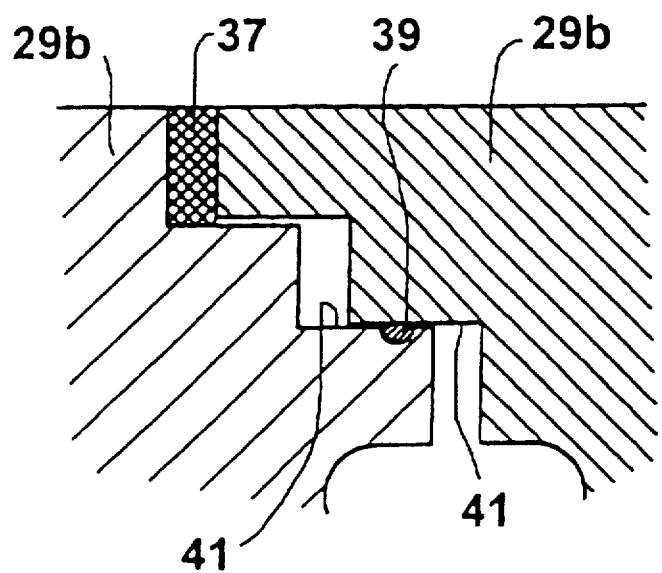
FIGS. 10 to 13 are fragmentary, sectional views of alternatives of a connection structure between the bottom elements according to a portion Z in FIGS. 7, 8 and 9.
Figure 11:
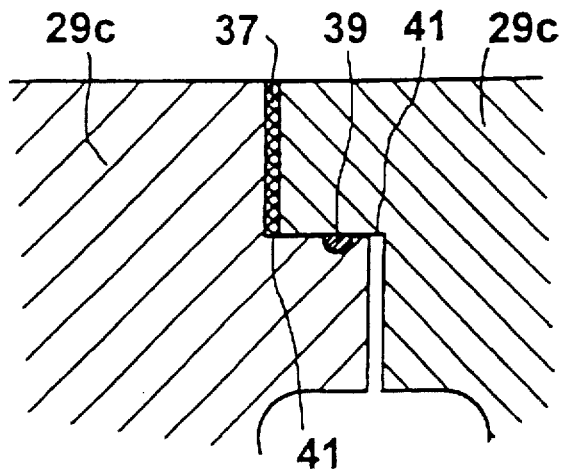

Further details and particular features of first, second and third bottom elements 29a, 29b and 29c are disclosed in the subsequent FIGS. 7 to 13. Firstly, FIGS. 7, 8 and 9 show proposed alternatives for bottom elements according to the portion X in FIG. 6. The first bottom element 29a according to FIG. 7 is supported, for example, on webs 31 similar to cooling fins. The bottom elements 29 in this case are also preferably made of a material having high thermal conductivity. A portion Z, which shows a connection technique or structure between the bottom elements 29, is dealt with in further detail below in the description of FIGS. 10 to 13. The same is true for the bottom elements according to FIGS. 8 and 9.

A side of the bottom elements 29a to 29c remote from the core melt may optionally be provided with a coating 33 which preferably prevents penetration of the bottom elements 29. The coating 33 may be applied onto the bottom elements 29 or may be applied subsequently as a continuous coating onto the already laid bottom elements 29.

In the embodiment of the second bottom elements 29b according to FIG. 8, webs 31a, which are constructed in the manner of cooling fins, are widened on their underside like a punch, so that improved support of the bottom elements 29b is provided. Furthermore, an area which is actually cooled in channels 35 formed by the fins 31a is increased as compared to the embodiment according to FIG. 7, as a result of which the cooling effect is improved. The connection technique between the cooling elements 29b according to the portion Z corresponds to that in FIG. 10.

The third bottom elements 29c according to FIG. 9 differ from those in FIG. 8 by an alternative connection technique, as well as a different measure of division. It is conceivable in this case, for example, for the bottom elements 29b in FIG. 8 to be constructed rectangularly according to the plan view of FIG. 4. In contrast, the bottom elements 29c according to FIG. 9 may be constructed to be long profiled elements which, if appropriate, fill the spreading chamber 19 over its entire length.

Considerable care must be taken in this case in the construction of the bottom elements 29a to 29c with regard to the connection technique or structure between the bottom elements. On one hand, they must have a sealing effect, so that the core melt cannot combine with the coolant. On the other hand, the elements must mechanically engage one another firmly, so that a structure with high mechanical load-bearing capacity is provided. Furthermore, the extent of the elements must be balanced by the temperature differences and temperature conditions which occur.

Figure 12:
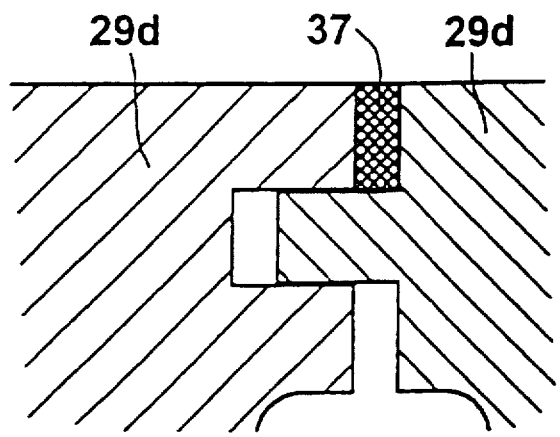
Figure 13:
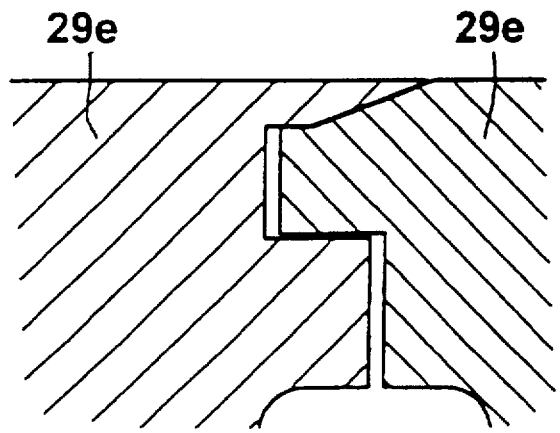

The embodiments shown in FIGS. 10 to 13 are firstly divided into stepped connections (FIGS. 10, 11) and tongue and groove connections (FIGS. 12 and 13). A factor which is common to all of the embodiments in this case is that a sealing effect with respect to the upper side must be achieved. In the embodiments according to FIGS. 10, 11 and 12, this is achieved by using a packing material 37 which fills a gap possibly existing between the bottom elements 29. In this case, the packing material 37 fulfills two functions. On one hand, it has an extensible-joint effect and, on the other hand, it exerts a sealing effect.

In addition, a sealing element 39 which is disposed between two adjoining surfaces 41 may be provided, for example. In this case, the sealing effect is the predominant function. In the embodiment according to FIG. 12, there is no sealing element since a labyrinth, which has the required sealing effect, is provided by the tongue and groove construction of the connection technique.

In the embodiment according to FIG. 13, it is also additionally possible to do without packing material, since penetration of core melt into the intermediate space between two bottom elements is prevented by a beveled construction of the tongue and groove connection.

Furthermore, a labyrinth effect is provided in this case as well, so that the requisite leak-tightness is likewise achieved. In this embodiment, a saving on additional material is possible by virtue of the increased outlay in the manufacturing technique.

Of course, any desired combinations of the above-mentioned features are possible, within the scope of ability of the person skilled in the art, without departing from the fundamental spirit of the present concept.

We claim:

1. In a reactor having a reactor pressure vessel, a device for collecting core melt from the reactor pressure vessel, comprising:
   a) a prechamber disposed below the reactor pressure vessel;
   b) a spreading chamber disposed laterally next to the reactor pressure vessel for receiving the core melt;
   c) a channel connecting said spreading chamber to said prechamber; and
   d) a base unit forming a bottom region at least of said prechamber, said base unit made of a material having such a high thermal conductivity that a part of the core melt forms a crust on said base unit after arrival of the core melt on said base unit and a remaining part of the core melt flows over a surface of the crust towards said spreading chamber.

2. The device according to claim 1, wherein said base unit is made of metal.

3. The device according to claim 1, wherein said base unit is composed of subunits.

4. The device according to claim 1, wherein said base unit is constructed as a crucible at said prechamber.

5. The device according to claim 1, wherein said base unit includes a cooling device.

6. The device according to claim 1, including packing units filling said prechamber.

7. The device according to claim 1, including packing units filling said channel.

8. The device according to claim 1, wherein said channel has a bottom surface formed by cooled bottom elements.

9. The device according to claim 1, wherein said spreading chamber has a bottom surface formed by cooled bottom elements.

10. The device according to claim 1, wherein said channel and said spreading chamber have bottom surfaces formed by cooled bottom elements.

11. The device according to claim 8, wherein said bottom elements have connection locations with tongue and groove connections.

12. The device according to claim 9, wherein said bottom elements have connection locations with tongue and groove connections.

13. The device according to claim 10, wherein said bottom elements have connection locations with tongue and groove connections.

14. The device according to claim 8, wherein said bottom elements have connection locations with a stepped connection.

15. The device according to claim 9, wherein said bottom elements have connection locations with a stepped connection.

16. The device according to claim 10, wherein said bottom elements have connection locations with a stepped connection.

17. The device according to claim 8, including a flexible seal interposed between said bottom elements.

18. The device according to claim 9, including a flexible seal interposed between said bottom elements.

19. The device according to claim 10, including a flexible seal interposed between said bottom elements.

* * * * *